United States Patent Office 3,804,945
Patented Apr. 16, 1974

3,804,945
PROCESSES FOR EXTRACTING METAL VALUES FROM SOLUTIONS
Kenneth Thomas Bartlett Scott, Reading, and John Herbert Grimes and Peter William Ball, Basingstoke, England, assignors to United Kingdom Atomic Energy Authority, London, England
No Drawing. Filed May 20, 1971, Ser. No. 145,504
Claims priority, application Great Britain, May 27, 1970, 25,600/70
Int. Cl. B01d 15/00, 15/08
U.S. Cl. 423—658.5                    11 Claims

ABSTRACT OF THE DISCLOSURE

A solution of a metal or metals is contacted with entities, e.g. in a column, of a hydrous metal-containing gel (made by mixing a salt solution or sol of the metal with a soluble polymer and contacting the mixture with a precipitant to precipitate the metal of the solution or sol as an insoluble compound) which sorbs one or more of the metals from the solution. The entities are subsequently contacted with a liquid which desorbs the metal from the entities, suitably a liquid which dissolves the sorbed metal. The hydrous metal-containing gel suitably contains the metal as an oxide, e.g. a ferric oxide gel. The process can be regarded as somewhat analogous to chromatographic adsorption. In addition to extraction, the process can effect separation, concentration and purification.

BACKGROUND OF THE INVENTION

This invention relates to processes for extracting metal values from solutions of their salts, and has applications in purifying, separating and concentrating metals in such solutions.

SUMMARY OF THE INVENTION

According to the present invention a process for extracting a metal value from a solution thereof comprises contacting said solution with entities of a hydrous metal-containing gel (as hereinafter defined) which sorbs the metal from the solution, and subsequently contacting the entities with a liquid which desorbs the metal from said entities.

By "entities of a hydrous metal-containing gel" is meant entities prepared by mixing a salt solution or sol of the metal with a soluble polymeric organic compound, and contacting the mixture with a precipitating solution or vapor to precipitate the metal of the salt or sol as an insoluble compound. The compound may be a metal oxide, for example. Processes for such preparation are described, for example, in our UK Specifications Nos. 1,175,834 (equivalent to U.S. 3,495,954) and in copending applications Nos. 145,018, filed May 19, 1971; 5,964, filed Jan. 26, 1970; and 170,994, filed Aug. 11, 1971. The entities so formed, e.g. spheres or irregular "gravel," may be used as the entities of the present process as formed, or may be comminuted, with or without drying, to a smaller size to constitute the present entities.

By a "hydrous" metal-containing gel is meant one in which the metal-containing compound has water molecules associated therewith, e.g. $Fe_2O_3 \cdot nH_2O$ is a constituent of a hydrous ferric oxide gel. The liquid used to desorb the metal may be one which forms a soluble complex of the metal, e.g. a carbon to complex or an ammine complex, and may further include a salt to improve the desorption efficiency. Copper (II), cobalt (II) and nickel (II), for example, form soluble ammine complexes, and uranium (VI) forms a soluble carbon to complex.

As an illustration of the present process, hydrous ferric oxide gel entities (viz. small spheres) prepared by mixing ferric chloride solution with guar gum and spraying the mixture into ammonium hydroxide solution, have been used for sorbing copper from a copper sulphate solution, the copper being subsequently desorbed from the spheres by a mixed ammonium hydroxide/ammonium chloride solution in which the copper dissolved to form an ammine complex. Details are given hereinafter.

The invention is not limited to the use of hydrous ferric oxide gels. For example hydrous chromic oxide gels are also suitable for copper. Nor need the metal content of the gel be an oxide. The invention is not limited to the extraction of copper. For example nickel and iron can be extracted from solution by ferric oxide gels.

The polymeric organic compound used in forming the gel entities need not be a galactomannan such as guar gum (or carob gum). Other materials disclosed in the aforementioned specifications can be used, also at least some starches.

The polymeric organic compound used should be one which, in conjunction with the insoluble metal compound in question, forms strong, discrete, entities, and the latter should readily sorb and desorb the desired metal as hereinbefore stated. The selection of a suitable hydrous insoluble metal compound and polymeric compound for the extraction of a specified metal is a matter of routine experimentation. Some suitable but not exclusive combinations are disclosed in the present specification.

The solution from which it is desired to sorb the metal may be passed through a column of the hydrated gel entities, or a mixture of the solution and the entities may be agitated, as by stirring, and the entities thereafter separated from the liquid, as by filtering or centrifuging. Desirably the entities are not allowed to dry after sorption, e.g. by leaving the column filled with liquid.

The solution from which the metal value is extracted by contact with the gel entities may contain the metal as a simple salt or as a metal-ion complex. The latter may be advantageous in effecting separation of one or more metals from a mixed metal solution by changing the affinity of a particular metal ion for the gel entities during the sorption stage.

In some applications the desorbing solution may advantageously include a dissolved salt. For example it is found that ammonium hydroxide containing dissolved ammonium chloride is a more efficient desorber than a solution of ammonium hydroxide alone, at least for some applications. Ammonium sulphate or other soluble ammonium salts can be used instead of the chloride.

Following desorption, the entities may be used again to effect further extraction, the desorption serving to regenerate the entities in a manner comparable with chromatographic adsorption so that the same entities can be used for many sorption/desorption cycles. Desirably the entities are washed clean of the desorbing liquid between cycles.

Hydrous ferric oxide gels have been found to be stable in buffer solutions, e.g. $HCl/Cl^-$, with pH's as low as 1.3, thus allowing the sorption of metal value from solutions of relatively high acidity. Hydrous thoria, titania and zirconia gels may be expected to be even more stable to acid solutions and thus especially suitable in such conditions.

The present invention also provides a process for concentrating a dilute salt solution. For example the dilute solution may be allowed to contact the entities until the latter have sorbed as much of the salt as they can; where the solution is passed through a column this point is ascertained when the salt starts to appear in the column outlet. Thereafter the salt may be desorbed from the column of entities by a volume of a desorbing liquid smaller than that from which the salt was sorbed into the entities. For example, using small hydrous ferric oxide/guar gum gelled spheres, formed as hereinafter described, copper sulphate solutions have been concentrated about ×45 by sorption in a column of the spheres and subsequent desorption by an ammonium hydroxide/ammonium chloride solution. Instead of using a column, mixing and filtering may be adopted, as hereinbefore described.

The present invention further provides a process for separating two or more metals, e.g. to effect purification. Separation may comprise contacting a solution of the two metal salts with a hydrous gel which sorbs at least two of the salts, in a column or otherwise, and subsequently contacting the entities with a liquid which preferentially desorbs one of them. For example a hydrous ferric oxide gel will sorb both copper and sodium from a mixed solution of their salts. The sodium may be desorbed with phenol and the copper with an ammonium hydroxide/ammonium chloride solution.

Alternatively a hydrous gel may be used which preferentially sorbs one or a selected number of the salts, which are subsequently desorbed. For example a hydrous ferric oxide gel will sorb a larger percentage of copper than of ferrous iron from a mixed solution of their salts, and a hydrous thoria sol will sorb an even larger percentage of copper than of cobalt from a mixed solution of their salts.

A further alternative, having sorbed two or more salts from a mixed solution, is to contact the entities with a solution which desorbs one or more of the metal salts and precipitates at least one of the remainder on to or into the entities, the precipitated metal being redissolved by subsequently contacting the entities with a further liquid which is a solvent for the precipitate. Metal oxide, hydroxide and carbonate precipitates may be eluted from hydrous oxide gels by acidic solutions which will dissolve the precipitate without affecting the gel. Hydrous ferric oxide gels, for example, have been found to be stable to solutions having a pH of at least 1.3, and most hydroxide and carbonate precipitates are soluble at such a pH. Alternatively the solution which desorbs one or more of the salts and precipitates at least one of the remainder may remove all or part of the precipitate from the gel entities in a finely divided form which can subsequently be filtered out. For example a mixed ferrous sulphate and copper sulphate solution may be sorbed and the entities subsequently contacted with ammonium hydroxide to form a soluble copper ammine complex and to partly precipitate the ferrous iron, some or all of the precipitate being washed off or out of the gel with the ammine solution.

The nature of the reaction between the sorbed metal and the gel entities is not fully understood. It is found that, at least in the case of copper sulphate sorbed by a ferric oxide gel, both the copper and the sulphate ions are sorbed, in the proportions in which they form the salt. Whether they are sorbed as the salt or as independent ions is not known, and the present invention is not limited to a process in which both the anions and cations of the salt are sorbed, but one would expect them to be sorbed as ions.

EXAMPLES OF THE PRESENT PROCESS

Some examples of the present process will now be described.

PREPARATION OF HYDROUS FERRIC OXIDE/ GUAR GUM GEL

Hydrous ferric oxide gel entities were prepared as follows. To 1 litre of a ferric chloride solution (100 g. Fe/l.) was added Supercol U (guar gum; 8 g.) with stirring. This mixture was sprayed into ammonium hydroxide solution (SG=0.910; 4 l.). After ageing for 2 hours, the gel precipitate was filtered and washed with demineralized water until the washings were neutral. After drying overnight at 95° C., the hydrous oxide gel so produced was sieved and the 90–150 micron particles selected for use as the gel entities of the present method.

PREPARATION OF HYDROUS ALUMINA/GUAR GUM GEL

To 1 litre of an aluminium nitrate solution (50 g. Al/l.) was added guar gum (8 g.) with stirring. The mixture was added dropwise into ammonium hydroxide (SG =0.910; 2 l.). After ageing for 1 hour, the gel precipitate was washed by decantation with demineralized water until the washings were neutral. After drying overnight at 95° C. the hydrous oxide gel was comminuted and the sieve fraction 150–350 microns was selected for use as the gel entities.

PREPARATION OF HYDROUS THORIA/GUAR GUM GEL

To 1 litre of a thorium nitrate solution (200 g. Th/l.) was added guar gum (5 g.) with stirring. This mixture was sprayed into ammonium hydroxide (SG 0.880; 2 l.). After ageing for 1 hour, the gel precipitate was filtered and washed by decantation until the washings were neutral. After drying overnight at 95° C., the hydrous oxide gel so produced was sieved and the fraction 150–350 microns selected for use as the gel entities.

PREPARATION OF HYDROUS FERRIC OXIDE/ GUAR GUM GEL BY THE "REVERSE GEL-PRECIPITATION" PROCESS OF APPLICATION NO. 170,994 FILED AUG. 11, 1971

To 1 litre of a ferric chloride solution (100 g. Fe/l.) was added guar gum (8 g.) with stirring. To this mixture was slowly added, with stirring, an amount of ammonium hydroxide slightly in excess of the stoichiometric, to precipitate the iron as a hydrous ferric oxide gel precipitate. After ageing for 30 minutes the precipitate was filtered and washed by decantation with demineralized water until the washings were neutral. After drying overnight at 95° C. the hydrous oxide gel was comminuted and the sieve fraction 150–350 microns selected for use as the gel entities.

PREPARATION OF HYDROUS THORIUM PHOSPHATE/DEXTRAN GEL

To 1 litre of a thorium nitrate solution (230 g. Th/l.) was added dextran (115 g.) with stirring. The mixture was added dropwise to a solution of sodium dihydrogen phosphate (138 g./l.) containing 5% phosphoric acid. After ageing for 1 hour, the gel precipitate was washed by decantation with demineralized water to remove nitrate ions. After drying overnight at room temperature the hydrous phosphate gel was sieved and the fraction 90 to 350 microns selected for use as the gel entities.

10 g. of the above-prepared hydrous ferric oxide gel particles were stirred with 200 ml. of a dilute copper sulphate solution (5 g. Cu./l.) for 30 minutes at room temperature. The gel was filtered and the amount of copper sulphate sorbed thereon estimated by measuring the copper concentration in the solution before and after sorption. The copper sulphate was desorbed from the gel by washing with 4× 50 ml. portions for 3, 5, 10 and 20 minutes respectively with various solutions.

The results obtained from consecutive sorption-desorption cycles using the same gel particles are given below.

Example 1.1—50% aqueous ammonium hydroxide solution

| Cycle No. | Cu (mg.) Sorbed | Cu (mg.) Desorbed | Percent recovery |
|---|---|---|---|
| 1 | 230 | 130 | 56 |
| 2 | 315 | 240 | 75 |
| 3 | 360 | 300 | 84 |
| 4 | 420 | 330 | 79 |
| 5 | 420 | 330 | 79 |

Example 1.2—75%/25% pyridine/water solution

| 1 | 220 | 130 | 59 |
|---|---|---|---|
| 2 | 210 | 115 | 72 |
| 3 | 195 | 100 | 51 |

Example 1.3—50% aqueous ammonium hydroxide containing 20% w./v. ammonium chloride (representative cycles)

| 1 | 310 | 255 | 82 |
|---|---|---|---|
| 3 | 350 | 350 | 100 |
| 5 | 360 | 350 | 97 |
| 8 | 405 | 390 | 96 |
| 10 | 425 | 395 | 93 |
| 12 | 425 | 355 | 84 |
| 13 | 415 | 350 | 84 |

The improved recovery by adding 20% w./v. ammonium chloride to the ammonium hydroxide solution is seen from the above results.

Example 2

10 g. of hydrous ferric oxide gel particles made as hereinbefore described was suspended in distilled water (25 ml.) and transferred to a burette to form a column, the excess water being run off. The receiver below the burette was subjected to vacuum to increase the flow rate, through the column, of the solution subsequently introduced at the top.

Example 2.1

100 ml. of a copper sulphate solution containing 4.3 g. Cu/l. was passed through the column, and the amount of copper sorbed by the gel particles estimated as before. The copper was then desorbed from the gel by passing a solution of 20% w./v. ammonium chloride in 0.880 ammonium hydroxide (50 ml.) through the column. This was repeated for 20 sorption/desorption cycles, the column being washed between cycles by passing distilled water therethrough, in order to remove residual ammonium hydroxide. The result for representative cycles is given below. It will be seen that after 20 cycles the percentage recovery was still about 90%.

| Cycle No. | Cu (mg.) Sorbed | Cu (mg.) Desorbed | Percent recovery |
|---|---|---|---|
| 1 | 195 | 195 | 100 |
| 2 | 250 | 230 | 92 |
| 5 | 237.5 | 220 | 93 |
| 9 | 250 | 225 | 90 |
| 10 | 247.5 | 230 | 93 |
| 12 | 255 | 225 | 88.5 |
| 15 | 247.5 | 230 | 93 |
| 19 | 250 | 230 | 92 |
| 20 | 247.5 | 230 | 93 |

Example 2.2

Using the same gel column as in Example 2.1, a further 30 sorption/desorption cycles were performed in the following manner. 55 ml. of a copper sulphate solution containing 4.3 g. Cu/l. was passed through the column and the amount of copper sorbed by the gel was determined to be about 235 mg., viz the amount of copper passed down the column.

The copper was desorbed from the column with a solution of ammonium hydroxide (SG 0.880)/20% w./v. ammonium chloride. The initial fraction (10–15 ml., representing the water content of the column) contained no detectable amount of copper. The following 5 ml. contained most of the copper as the deep blue tetrammine, a second 5 ml. contained substantially less copper, and in a third 5 ml. no copper was detected. This procedure constituted one cycle. The column was then washed with demineralized water before beginning the next cycle. The results for a representative selection of these cycles are given below.

| Cycle No. | Percent of sorbed Cu recovered in— 1st 5 ml. | 2nd 5 ml. | 3rd 5 ml. | Total percent recovery |
|---|---|---|---|---|
| 1 | 93 | 5.5 | 0 | 98.5 |
| 5 | 93 | 3.1 | 0 | 96 |
| 10 | 92 | 2.9 | 0 | 95 |
| 13 | 84 | 3.1 | 0 | 87 |
| 18 | 93.5 | 2 | 0 | 95.5 |
| 21 | 87 | 3.4 | 0 | 90.5 |
| 26 | 87 | 4 | 0 | 91 |
| 28 | 86 | 4.5 | 0 | 90.5 |
| 30 | 87 | 4 | 0 | 19 |

It will be noted about 90% of the copper present in the initial 55 ml. of solution was recovered in the first 5 ml. of desorbing solution, i.e. a concentration of about ×11 in bulk of liquid with only a 10% loss of copper. Only a small percentage, 5% or less, of the copper appeared in the second 5 ml., and no measurable percentage in the third 5 ml. Moreover around 90% extraction was still obtained after a total of 50 cycles.

Although in the above examples the copper salt is copper sulphate, similar results may be obtained with other soluble copper salts such as copper nitrate and copper chloride. Oxide gels other than ferric oxide/guar gum gels may also be used, e.g. a hydrous alumina/guar gum gel (Al:guar gum, 6.5:1 w./w.) which, although it has a lower capacity for copper than the ferric oxide/guar gum gel (Fe:guar gum, 12.5:1 w./w.), also gives a copper recovery of about 90%.

Example 3

In qualitative experiments, hydrous thoria and zirconia gel entities prepared according to the process of U.S. Pat. 3,495,954 have been found to behave in a manner similar to the hydrous ferric oxide gel entities of Examples 1 and 2 in sorbing and desorbing copper or nickel from sulphate solutions. In these gel entities the polymeric compound was dextran.

Example 4.1

In each cycle 120 mg. of nickel contained in a dilute solution of nickel sulphate was sorbed on a column of a hydrous thoria/guar gum gel (10 g.) prepared as hereinbefore described. In the first two cycles the nickel concentration was 5.0 g. Ni/l. while in the remaining four cycles the nickel concentration was 2.45 g. Ni/l. The nickel was recovered from the gel by passing ammonium hydroxide (SG 0.880)/20% w./v. ammonium chloride through the column. The nickel was collected in two main fractions, the first containing more of the nickel than the second.

| Cycle No. | 1st fraction Vol. (ml.) | 1st fraction Wt. of Ni (mg.) | Percent recovery | 2nd fraction Vol. (ml.) | 2nd fraction Wt. of Ni (mg.) |
|---|---|---|---|---|---|
| 1 | 2.5 | 57.0 | 47.5 | 5.0 | 35 |
| 2 | 2.5 | 66.0 | 55.0 | 5.0 | 7.5 |
| 3 | 2.5 | 55.0 | 46.0 | 4.0 | 21 |
| 4 | 2.5 | 59.0 | 49.0 | 5.0 | 13 |
| 5 | 2.5 | 61.1 | 51.0 | 5.0 | 17.5 |
| 6 | 2.5 | 63.5 | 53.0 | 7.0 | 62 |
| Average | 2.5 | 60.4 | 50.3 | 5.2 | 26.0 |

The average nickel concentration in the first fraction was 24 g. Ni/l. and in the second 5.0 g. Ni/l.

Example 4.2

Substituting the hydrous ferric oxide/guar gum gel hereinbefore described, more than 70 mg. (59%) of the nickel was desorbed in the first fraction at a concentration of 28 g. Ni/l. The concentration of nickel in the second fraction was 3.5 g. Ni/l.

Comparison of the results in Example 4.1 with Example 2 shows that the capacity of the ferric oxide/guar gum gel column for nickel (~12 mg. Ni/g. of gel) is about half that for copper (~24 mg. Cu/g. of gel).

Ammonium hydroxide was found to be a less efficient desorber for Ni(II) than the ammonia/ammonium chloride mixture.

Example 5

A column containing a hydrous chromic oxide gel prepared in a similar manner to the hydrous ferric oxide gel was found to sorb copper from a copper sulphate solution more efficiently than the ferric oxide gel. The chromic oxide gel sorbed approximately 600 mg. Cu/10 g. as compared with 250 mg. Cu/10 g. (see Example 2.1) for the ferric oxide gel. The copper was readily desorbed from the chromic oxide gel with ammonium/hydroxide solution.

Example 6

A hydrous ferric oxide gel, and a mixed ferric/chromic/nickel oxide gel (metal ratios 74/18/8) have been found efficient in sorbing sodium and calcium from hydroxide and chloride solutions thereof. The mixed gel was prepared by spraying a mixed nitrate solution, plus guar gum, into alkali. Phenol and ammonium nitrate are both efficient desorbers for sodium and calcium. The separation of copper and sodium may thus be achieved by sorbing both, followed by desorption with phenol to remove the sodium, and then ammonium hydroxide to remove the copper. For example a solution of copper sulphate (~5 g. Cu/l.) and sodium sulphate (~1 g. Na/l.) was passed down a ferric oxide/guar gum gel column. A 1% phenol solution was then passed down the column in order to desorb the sodium, followed by an ammonium hydroxide/ammonium chloride solution as before to desorb the copper. The main ammine fraction contained copper at a concentration of about 40 g./l. and sodium at about 4 mg./l., i.e. a copper-to-sodium ratio of about $10^4$.

Example 7

A dilute solution of ferrous sulphate (5 g. Fe/l.) was passed down a column containing a hydrous ferric oxide gel (10 g.) prepared as aforesaid. The ferrous iron was recovered by passing down the column a solution of ammonium hydroxide (SG=0.910)/ammonium chloride 20% w./v. The results for four successive cycles are given below.

| Cycle | Fe (mg.) Sorbed | Desorbed | Percent recovery |
|---|---|---|---|
| 1 | 95 | 78 | 82 |
| 2 | 100 | 85 | 85 |
| 3 | 101 | 87 | 86 |
| 4 | 104 | 88 | 85 |

It was found that the first few millilitres of the elute contained 60% of the desorbed ferrous iron as a very fine precipitate of ferrous hydroxide, the remaining 40% being recovered in solution.

Example 8

A very dilute solution of copper sulphate (0.508 g. Cu/l.) was passed down a column containing 10 g. of hydrous ferric oxide gel particles prepared as already described, until the column could absorb no more, i.e. until copper appeared in the column outlet. The sorbed copper was recovered from the gel by passing ammonium hydroxide (SG 0.880)/20% w./v. ammonium chloride solution through the column. The copper ammine was collected in a single 10 ml. volume after running off the liquid initially in the column, as described in Example 2. The results for six successive cycles are given below, the column being washed between cycles with distilled water.

| Cycle | Cu (mg.) Sorbed | Desorbed | Percent recovery |
|---|---|---|---|
| 1 | 250 | 229 | 91.5 |
| 2 | 252 | 628 | 90.5 |
| 3 | 251.5 | 225 | 89.5 |
| 4 | 251 | 230 | 92 |
| 5 | 248 | 234 | 94.5 |
| 6 | 249 | 232 | 93 |

It will be noted that the amount of copper sorbed on the column had not been decreased by using a more dilute solution than in Example 2, and that the concentration of copper increased about 45-fold in the process, i.e., from about 0.5 g./l. to about 23 g./l.

Example 9

Simultaneous extraction of copper and ferrous iron from solution onto a hydrous ferric oxide gel and their subsequent separation. The hydrous ferric oxide gel column was prepared as before. A solution (60 ml.) containing copper sulphate (5.0 g. Cu/l.) and ferrous sulphate (5.3 g. Fe/l.) was passed down the column and the amounts of copper and ferrous iron sorbed by the column determined. After washing the column with distilled water, the metal ions were desorbed by passing an ammonium hydroxide (SG 0.880)/20% w./v. ammonium chloride solution through the column. The amounts of copper and ferrous iron desorbed in a 25 ml. fraction was determined. Between cycles the column was washed with distilled water which was cloudy as it left the column due to the presence of precipitated ferrous hydroxide. Eight cycles were performed.

| Cycle | Sorbed (mg.) Cu | Fe | Desorbed (mg.) Cu | Fe |
|---|---|---|---|---|
| 1 | 235 | 49 | 219 | Trace |
| 2 | 240 | 80 | 199 | Trace |
| 3 | 240 | 113 | 204 | Trace |
| 4 | 235 | 109 | 209 | Trace |
| 5 | 198 | 123 | 188 | 18 |
| 6 | 188 | 81 | 173 | 13 |
| 7 | 175 | 81 | 137 | 30 |
| 8 | 180 | 90 | 117 | 58 |

The average amount of ferrous iron desorbed was 15 mg. (16.5%) and the average amount of copper desorbed was 180 mg. (85%).

It will be seen that a significant separation of copper and iron was achieved because the copper was preferentially sorbed onto the gel column and thereafter preferentially desorbed from the column by the ammonium hydroxide/ammonium chloride solution.

Example 10

10 g. of hydrous ferric oxide/guar gum gel particles (Fe:guar gum; 12.5:1 w./w.) prepared by the "reverse gel-precipitation process" as described hereinbefore were suspended in distilled water (25 ml.) and transferred to a burette to form a column as before. 55 ml. of a dilute copper sulphate (4.45 g. Cu/l.) were passed down the column. The copper was recovered by passing ammonium hydroxide (SG 0.880)/20% w./v. ammonium chloride through the column as before. Four cycles were performed. The column was washed with distilled water between cycles. The majority of the copper was recovered in about 5 ml., a much smaller amount being recovered in a second fraction.

| Cycle | 1st fraction Vol. (ml.) | Cu desorbed (mg.) | Percent recovery | 2nd fraction Vol. (ml.) | Cu desorbed (mg.) |
|---|---|---|---|---|---|
| 1 | 5.2 | 225 | 92.5 | 4.1 | 0.7 |
| 2 | 5.6 | 235 | 96.5 | 5.0 | 0.7 |
| 3 | 7.8 | 220 | 90.5 | 5.8 | 1.7 |
| 4 | 5.4 | 230 | 94.5 | 7.8 | 3.0 |
| Average | 6.0 | 227.5 | 93.5 | 5.7 | 1.5 |

The recovery and concentration of copper was very similar to that using the hydrous ferric oxide/guar gum gel used in Example 2.

Example 11

Separation of copper and cobalt using a hydrous thoria/guar gum gel. The hydrous thoria gel column (Th:guar, 40:1 w./w.) was prepared in the manner hereinbefore described. A solution (55 ml.) containing copper sulphate (4.2 g. Cu/l.) and cobalt sulphate (2.6 g. Co/l.) was passed through the column. The copper being sorbed more strongly moved more slowly down the column than the cobalt. The amount of copper which was passed through the column was approximately equal to the capacity of the column for copper, as previously estimated. The cobalt, displaced by the copper, was collected as it left the column. (About 25 ml. of distilled water was passed through the column to remove the displaced cobalt). The copper was then desorbed by passing ammonium hydroxide (SG 0.880) 20% w./v. ammonium chloride (10 ml.) down the column. The copper was collected in two fractions, the first containing the bulk of the copper. Four cycles were performed, the column being washed between cycles with distilled water.

The average amount of nickel recovered was 115.5 mg. (95%) with 107.5 mg. (~90%) of this amount in the first two fractions. The average amount of copper recovered was 216 mg. (90%) with 194 mg. (~81%) of this amount in the fourth fraction. The Cu:Ni ratio in the solution before sorption was about 2, while those in the first and second fractions were about 0.1 and 0.8 respectively, and by contrast about 25 in the fourth fraction. Whereas the nickel concentration in the first fraction was only about 50% more than that in the solution passed down the column, the copper concentration in the first fraction was increased more than five-fold. Fraction 2 could be recycled to effect further separation.

Example 13

A dilute solution of copper nitrate (5.20 g. Cu/l., 55 ml.) was passed down a column containing 10 g. of hydrous thorium phosphate/dextran gel particles prepared as hereinbefore described. From visual observation, all the copper appeared to have been sorbed; indeed the capacity of the column appeared to appreciably exceed the amount of copper passed down the column. The sorbed copper was recovered by passing ammonium hydroxide (SG 0.880)/20% w./v. ammonium chloride

| Cycle | Co desorbed | | | Cu desorbed | | | | |
|---|---|---|---|---|---|---|---|---|
| | | | | 1st fraction | | | 2nd fraction | |
| | Vol. (ml.) | Mg. | Percent recovered | Vol. (ml.) | Mg. | Percent recovered | Vol. (ml.) | Mg. |
| 1 | 37 | 135 | 94.5 | 5.8 | 182 | 79 | 6.2 | ~1.0 |
| 2 | 36 | 137 | 96 | 5.8 | 186 | 81 | 5.4 | ~2.0 |
| 3 | 37 | 134 | 94 | 5.7 | 184 | 80 | 5.6 | ~1.5 |
| 4 | 35 | 131 | 91.5 | 5.9 | 188 | 81.5 | 6.0 | ~2.0 |
| Average | ~36 | 134.5 | 94 | 5.8 | 185 | 80.5 | 5.8 | ~1.5 |

The average amount of cobalt recovered in the aqueous fraction was 134.5 mg. (94%) while the average amount of copper recovered in the first ammonium hydroxide/ammonium chloride fraction was 185 mg. (80.5%). The increase in the copper concentration was almost 8-fold.

Example 12

Separation of copper and nickel using a hydrous thoria/guar gum gel. The same gel column as in Example 11 was used. A solution (55 ml.) containing copper sulphate (4.35 g. Cu/l.) and nickel sulphate (2.18 g. Ni/l.) was passed through the column. The nickel, which was sorbed less strongly than the copper was displaced by it. Most of the nickel was collected in two fractions (the first and second tabulated below) as it left the column. About 20–25 ml. of distilled water was passed through the column in displacing this nickel. The copper was then desorbed by passing ammonium hydroxide (SG 0.880)/20% w./v. ammonium chloride (10 ml.) through the column. Most of the copper was collected in a fourth fraction. The third fraction was seen by visual observation (almost colorless) to contain less metal ions than the fifth fraction tabulated below. Four cycles were performed, the column being washed between cycles with distilled water.

Desorption of Ni

| Cycle | 1st fraction | | 2d fraction | | 4th fraction | | 5th fraction | |
|---|---|---|---|---|---|---|---|---|
| | Vol. (ml.) | Mg. | Vol. (ml.) | Mg. | Vol. (ml.) | Mg. | Vol. (ml.) | Mg. |
| 1 | 31 | 75 | 12.5 | 23 | 8 | 10 | 6 | <0.4 |
| 2 | 34 | 100 | 12 | 10 | 9 | 6.5 | 6 | <0.4 |
| 3 | 29 | 102 | 5.5 | 11 | 7 | 9 | 12 | 1.1 |
| 4 | 32 | 97 | 7 | 12 | 8 | 7 | 7 | <0.5 |

Desorption of Cu

| Cycle | 1st fraction | | 2d fraction | | 4th fraction | | 5th fraction | |
|---|---|---|---|---|---|---|---|---|
| | Vol. (ml.) | Mg. | Vol. (ml.) | Mg. | Vol. (ml.) | Mg. | Vol. (ml.) | Mg. |
| 1 | 31 | 9.5 | 12.5 | 11.5 | 8 | 194 | 6 | 1 |
| 2 | 34 | 12 | 12 | 10 | 9 | 187 | 6 | 3 |
| 3 | 29 | 5.5 | 5.5 | 12.5 | 7 | 199 | 12 | 2.5 |
| 4 | 32 | 9 | 7 | 11 | 8 | 194 | 7 | 2 | through the column. The copper ammine was collected in two fractions, the first containing the bulk of the copper. The results for four successive cycles are given below, the column being washed between cycles with distilled water.

| Cycle | 1st fraction | | 2d fraction | |
|---|---|---|---|---|
| | Vol. (ml.) | Mg. | Vol. (ml.) | Mg. |
| 1 | 6.4 | 109 | 7.0 | 2 |
| 2 | 8.2 | 287 | 6.7 | 4.5 |
| 3 | 11.0 | 301 | 8.2 | 5.5 |
| 4 | 11.0 | 310 | 6.0 | 3.0 |

The average amount of copper recovered in the first fraction was 252 mg. (89%).

Small changes in the metal-to-polymer ratio in the gel have been found to have little effect on the sorption-desorption characteristics of the gel, although the capacity of a ferric oxide/guar gum gel can be increased by about 5–10% by doubling the iron-to-guar gum ratio to 25:1. Changing the polymer however changes the sorption characteristics of the gel. For copper (II), cobalt (II) and uranyl ions, ferric oxide/guar gum gels have a higher capacity than ferric oxide/dextran gels; but thoria/guar gum gels have a lower capacity than thoria/dextran gels. (It should be noted that the capacity of a thoria/guar gum gel for copper (II) is much higher ($\times 40$) than that of thoria precipitated in a similar manner in the absence of a polymer.) Changes in the metal salt, e.g. from chloride to nitrate, used in the preparation of the gel are also without significant effect. Mixed metal oxide gels, e.g. ferric-chromic oxide gels, have capacities intermediate between those of the pure oxide gels.

It will be understood that the particular metals hereinbefore disclosed as contacting the gel entities to effect extraction, separation, concentration or purification are only disclosed by way of example, and that the process is not limited to these metals. The process can be applied to other metals, for example manganese and chromium, which can be sorbed and desorbed by suitable gels. Similarly the gels usable are not limited to the particular gels disclosed, for example tungstate and silicate gels can be used, and the same is true of suitable desorbing solutions. The selection of a suitable gel for use with a given metal solution or mixed metal solution is a matter of simple experiment. The reactions between the desorbing solutions and the sorbed metals, e.g. to form soluble ammines or insoluble hydroxides, are, of course, known reactions.

We claim:

1. A process for extracting a metal value from an aqueous solution of a compound of said metal comprising:
    contacting said solution with entities of hydrous metal oxide-containing gel, said gel sorbing both the cation and the anion of said compound from said solution, said hydrous metal oxide-containing gel comprising an organic polymer and a hydrous metal oxide and having been prepared by mixing a salt solution or sol of a metal with a water soluble organic polymer having a plurality of hydroxyl groups to form a complex of the polymer and the metal ions of said solution or sol and contacting the complex with a precipitating agent to precipitate the metal of the salt or sol as an insoluble hydrous metal oxide by a reaction involving double decomposition; and
    subsequently contacting the entities with an aqueous desorbing liquid which removes the sorbed metal from the entities by interaction with the sorbed metal to form a soluble compound of the sorbed metal.

2. A process as claimed in claim 1 wherein the hydrous metal oxide is ferric oxide, thoria, zirconia or chromic oxide.

3. A process as claimed in claim 1 wherein the desorbing liquid is one which forms a soluble complex with the sorbed metal.

4. A process as claimed in claim 3 wherein the desorbing liquid includes a salt to improve the desorption efficiency.

5. A process as claimed in claim 3 wherein the desorbing liquid comprises ammonium hydroxide.

6. A process as claimed in claim 5 wherein the desorbing liquid also comprises a soluble ammonium salt.

7. A process as claimed in claim 1 wherein the metal value is copper, nickel, sodium, calcium, iron, or cobalt.

8. A method as claimed in claim 1 for concentrating a dilute solution wherein the sorbed metal is desorbed into a smaller volume of liquid than that from which it was sorbed.

9. A method as claimed in claim 1 for separating at least two metals wherein the solution contains said two metals, comprising sorbing both said metals by said gel entities and subsequently contacting said entities with a liquid which preferentially desorbs one of them.

10. A method as claimed in claim 1 for separating at least two metals wherein the solution contains said two metals, comprising preferentially sorbing one of said two metals from said solution by said gel entities and subsequently desorbing said one metal from said entities.

11. A method as claimed in claim 1 for separating at least two metals wherein the solution contains said two metals, comprising sorbing both said metals by said gel entities and subsequently contacting the entities with a liquid which desorbs one said metal and precipitates the other.

References Cited

UNITED STATES PATENTS 3,332,737   7/1967   Kraus _____ 23—50 R
3,495,954   2/1970   Grimes et al.

OTHER REFERENCES

Kraus et al: "Journal of The American Chemical Society," vol. 78, 1956, p. 249.

Carlson et al.: "U.S. Atomic Energy Commission Report, ORNL–2159, Oct. 11, 1956, pp. 40–42.

Koethoff et al.: "Journal of Physical Chemistry," August 1932, pp. 2113–2126.

HERBERT T. CARTER, Primary Examiner

U.S. Cl. X.R.

423—6, 21, 22, 25, 49, 53, 62, 69, 99, 111, 138, 155, 179